United States Patent [19]
Miyadera

[11] Patent Number: 6,133,951
[45] Date of Patent: Oct. 17, 2000

[54] STILL-VIDEO CAMERA WITH FUNCTION SETTING OPERATION

[75] Inventor: Shunichi Miyadera, Tokyo, Japan

[73] Assignee: Asahi Kogaku Kogyo Kabushiki Kaisha, Tokyo, Japan

[21] Appl. No.: 08/987,162

[22] Filed: Dec. 8, 1997

Related U.S. Application Data

[63] Continuation of application No. 08/436,861, May 8, 1995.

[30] Foreign Application Priority Data

May 10, 1994 [JP] Japan ................ P06-120617

[51] Int. Cl.[7] .................................................. H04N 5/225
[52] U.S. Cl. ..................... 348/220; 348/370; 348/231; 235/472.01
[58] Field of Search .................................... 348/207, 220, 348/221, 231, 232, 239, 294, 335, 344, 358, 369; 396/297, 300, 100; 235/462, 375, 472.01, 462.23; 382/209, 218, 317; H04N 5/225

[56] References Cited

U.S. PATENT DOCUMENTS

| 4,999,661 | 3/1991 | Ueno et al. ............................. 396/100 |
| 5,146,353 | 9/1992 | Isoguchi et al. ........................ 348/232 |
| 5,606,160 | 2/1997 | Tani et al. ........................... 235/472.01 |

*Primary Examiner*—Tuan Ho
*Attorney, Agent, or Firm*—Greenblum & Bernstein, P.L.C.

[57] ABSTRACT

A still-video camera has an image receiving unit (CCD) on which an image of an object to be recorded or an image of a data symbol is formed. The data symbol indicates information corresponding to a photography mode of the still-video camera. When the data symbol is read by the still-video camera, the photographing leses are moved to a position corresponding to macrophotography mode, and thus the photography mode indicated by the data symbol is read by the still-video camera. Then, the photographing lens system is moved to a position corresponding to the photography mode designated by the data symbol, so that photography is carried out in accordance with the photography mode.

38 Claims, 11 Drawing Sheets

STILL-VIDEO CAMERA WITH FUNCTION SETTING OPERATION

This is a continuation of Application No. 08/436,861, filed May, 8, 1995, the contents of which are expressly incorporated herein in its entirety.

BACKGROUND OF THE INVENTION

1. Field of the Invention

The present invention relates to a still-video camera.

2. Description of the Related Art

In a conventional still-video camera, photography can be performed in a photography mode such as a program mode, an aperture-priority mode or a shutter speed priority mode. These modes are set by operating a switch provided on a surface of the camera body of the still-video camera. However, when a lot of different photography modes can be set for the still-video camera, the number of setting operations required for setting the photography modes is large, and the setting operations are tedious. Therefore, it has been desired to develop a still-video camera in which the setting operation is easy.

SUMMARY OF THE INVENTION

Therefore, an object of the present invention is to provide a still-video camera for which the setting operation for setting the photography mode can be easily done.

According to the present invention, there is provided a still-video camera comprising a photographing lens system, an image receiving unit, mannualy selecting means and decoding means. The photographing lens system forms an image of an object at a predetermined position. The image receiving unit, located at the predetermined position, generates an image signal corresponding to the image of the object. The mannualy selecting means mannualy selects one of optical photographing function setting or normal photography. The decoding means decodes information of a data symbol based on an image signal generated by the image unit when the optical photographing function setting is selected and when the data symbol as an object is photographed through the photographing lens system. The data symbol has a pattern corresponding to photographing information.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

The present invention will now be described with reference to embodiments shown in the drawings.

Figure 1:
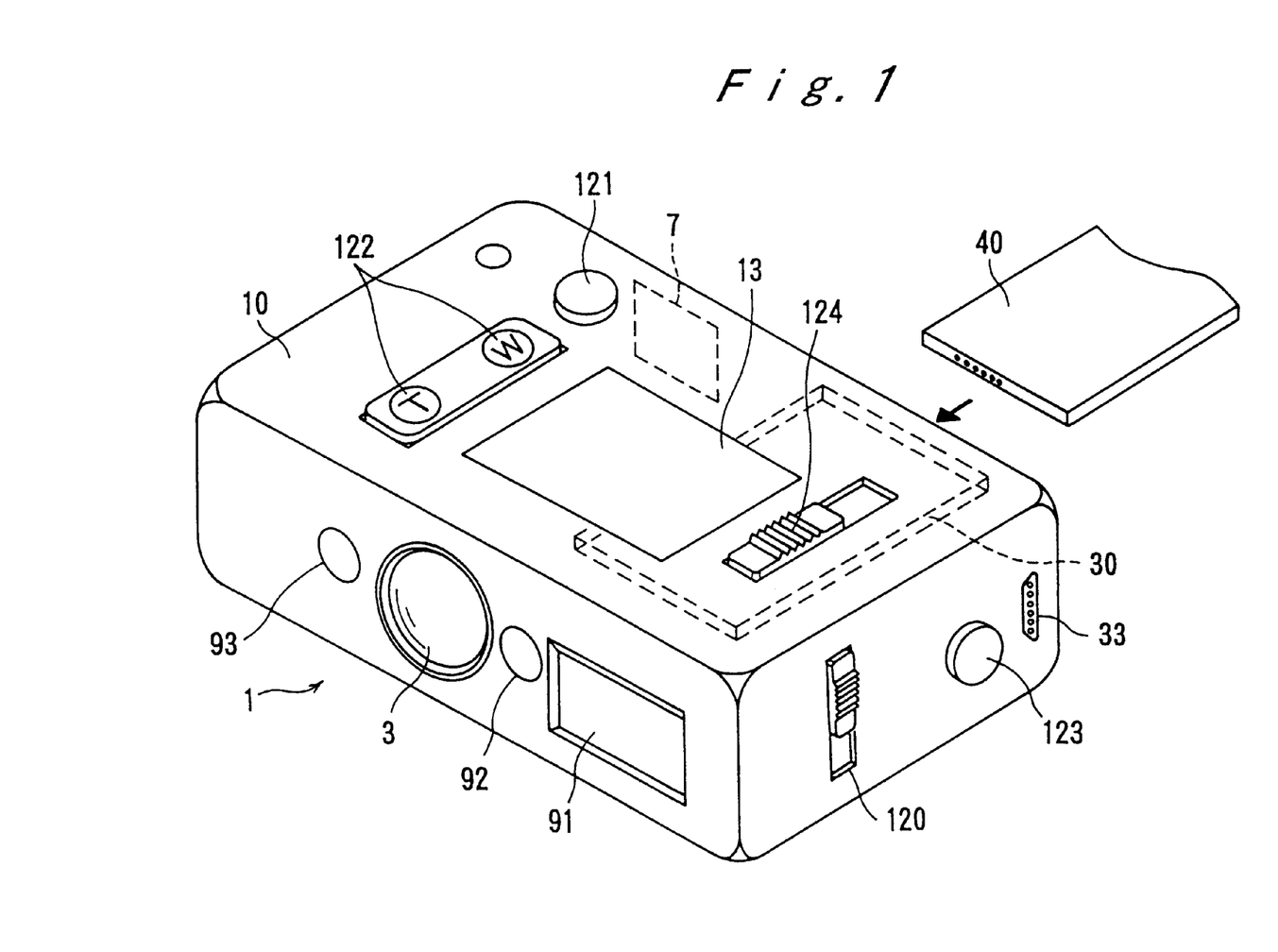
FIG. 1 is a perspecitve view showing a still-video camera of an embodiment of the present invention.

FIG. 1 is a perspecitve view showing a still-video camera 1, which has a box-type camera body 10. A front surface of the camera body 10 is provided with a photographing lens system 3, a radiation unit 91 of an electronic flash and a pair of. light sources 92 and 93 of an illumination unit. A back surface of the camera body 10 is provided with a view-finder 7 and a mounting unit 30 in which an IC memory card 40 is mounted. An upper surface of the camera body 10 is provided with a main switch 120, a release switch 121, a zoom switch 122, an eject switch 124 and a display unit 13. A side surface of the camera body 10 is provided with a mode selecting switch 123 for setting a reading mode, in which macro photography is performed to photograph a data symbol or a usual photographing mode in which a usual photography is performed. Namely, the mode selecting switch 123 is manually selecting means that allows an operator to select either a reading mode, corresponding to an optical photographing function setting, or a usual photography mode, corresponding to a normal photography.

Figure 2:
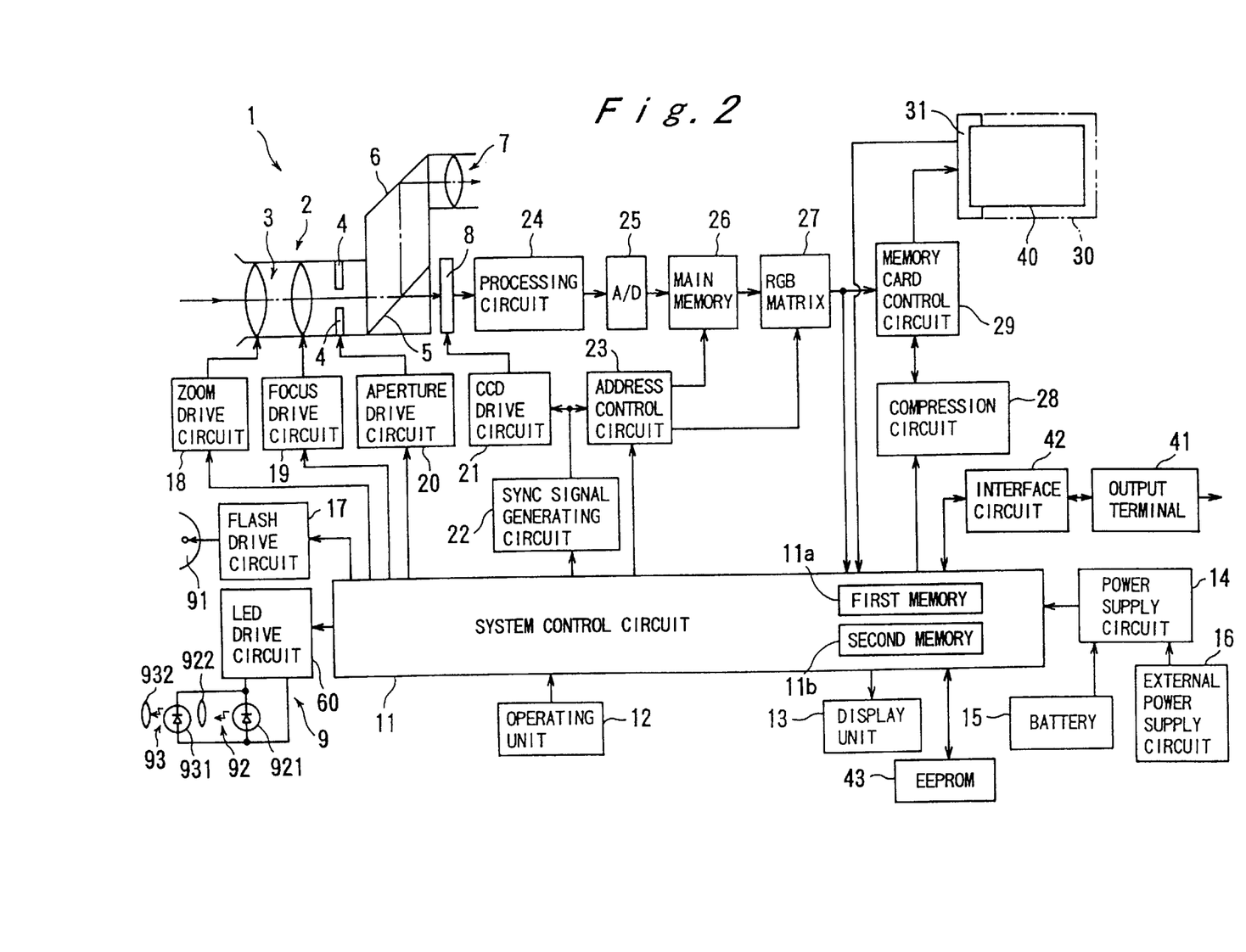
FIG. 2 is a block diagram showing the still-video camera.

FIG. 2 is a block diagram showing the still-video camera 1. This still-video camera 1 is provided with a system control circuit 11 which has a micro-computer for setting the photography mode of the still-video camera, decoding a data symbol, and performing some ther operations, as described later.

A photographing optical system 2 has the photographing lens system 3, an aperture 4 and a half mirror 5. The photographing lens system 3 and the aperture 4 are mounted in a cam cylinder, and the half mirror is provided behind the cam cylinder.

The photographing lens system 3 is mounted in the cam cylinder and can be moved along the optical axis thereof by a rotation of the cam cylinder. A zooming operation of the photographing lens system 3 is controlled by a zoom drive circuit 18 which has a zooming drive motor (not shown) and is operated by the zoom switch 122. A focusing operation of the photographing lens system 3 is controlled by a focus drive circuit 19 which has a focusing drive motor (not shown) and is operated by partly depressing the release switch 121. A command signal for the focusing operation is outputted from the system control circuit 11 in accordance with an object distance.

The aperture 4 has a plurality of blades, and the opening diameter of the aperture 4 is changed by a rotation or displacement of the blades. The aperture 4 is controlled by an aperture drive circuit 20 having an aperture drive motor (not shown). The aperture 4 can operate also as a shutter. Command signals for an aperture value and a shutter speed (i.e., an electric charge accumulating time in a CCD 8) are outputted from the system control circuit 11, in which an exposure calculation is carried out based on luminance data obtained by a photometry unit (not shown). Namely, in accordance with the command signals, the blades of the aperture 4 are driven and closed at the predetermined shutter speed.

Light from an object passes through the photographing lens system 3 and the aperture 4 and reaches the half mirror 5. A portion of the light is reflected by the half mirror 5 and is led to a view-finder optical system having a reflecting mirror 6 and a view-finder 7. The remaining part of the light passes through the half mirror 5 and is led to a CCD (charge coupled device) 8, i.e. an image receiving unit, disposed behind the photographing optical system 2. Thus, the object image is formed on the light receiving surface of the CCD 8, namely the object image is formed at the imaging plane of the photographing lens system 3.

The CCD 8 is provided in a plane in which an image can be focused or formed by the photographing system 2. The CCD 8 has a plurality of photodiodes disposed in a matrix arrangement. The CCD a is driven by a CCD drive circuit 21 in accordance with a syncronizing signal outputted from a synchronizing signal generating circuit 22, which is controlled by the system control circuit 11, and is operated by fully depressing the release switch 121. Namely, when the release switch 121 is fully depressed, the CCD 8 is exposed at the proper shutter speed obtained in accordance with the luminance data as described above, and thus, in each photodiode, electric charges are accumulated, the amount of which corresponds to the light received by the photodiode. The accumulated electric charges are outputted from the CCD 8 and inputted into a CCD signal processing circuit 24.

A color filter is disposed on the light receiving surface of the CCD 8. The color filter is a complementary color filter with a checkerboard arrangement in which groups of green (G), magenta (Mg), yellow (Ye) and cyan (Cy) filter elements are arranged. One of each of these filter elements is disposed on each of the photodiodes of the CCD 8. Four pixels covered by four filter elements (i.e. one each of green, magenta, yellow or cyan on each photodiode) form one pixel unit of one image.

As described later, not only an image to be recorded in the IC memory card 40 is obtained by the CCD 8, but also a two-dimensional data symbol for setting the photography mode of the still-video camera is optically detected by the CCD 8.

The signals outputted from the CCD 8 are inputted into a CCOD signal processing circuit 24, in which the signals are subjected to a predetermined process so that magenta, yellow, cyan and green analog image signals of the photographed object image are obtained. The analog signals are inputted into an A/D converter 25, and thus complementary color digital signals of magenta, yellow and cyan, and a primary color digital signal of green are obtained, and are stored in a main memory 26.

The address of the main memory 26, in which each of the digital signals is written, is controlled by an address control circuit 23, which operates a writing address counter provided therein based on a synchronizing signal outputted by the synchronizing signal generating circuit 22. When the signal stored in the main memory 26 is read out, the address control circuit 23 operates a read address counter provided therein based on a clock signal outputted from the system control circuit 11, so that addresses of the main memory 26 in which each of the signals is stored, is controlled.

The signals read from the main memory 26 are inputted into an RGB-matrix circuit 27. In the RGB-matrix circuit 27, the magenta, yellow, cyan and green signals are subjected to a predetermined process to be converted into red (R), green (G) and blue (B) digital image signals, i.e., primary digital signals, in accordance with a clock signal outputted from the address control circuit 23.

When an image signal is recorded in the IC memory card 40, each of the primary color signals is inputted into a memory card control circuit 29, in which the primary color digital image signals are compressed by a predetermined amount by an image signal compression circuit 28 controlled by the system control circuit 11. The compressed image signals are outputted from the memory card control circuit 29 and transmitted to a mounting unit 30 in which an IC memory card 40 is mounted. Then, the compressed image signals are stored at a predetermined IC memory address provided in the IC memory card 40 through a connector 31 of the mounting unit 30.

The IC memory card 40 is a recording medium in which an image photographed by the still-video camera 1 is recorded. The IC memory of the IC memory card 40 has a recording area for storing the image signal and a recording area for storing card attributes. The card attributes include the kind of IC memory (static RAM, or flash memory, for example), the storage capacity of the IC memory, the access speed, etc. The IC memory may store information regarding exposure conditions such as shutter speed, aperture value, a combination of the shutter speed and the aperture value, and photography conditions such as the photography date.

The IC memory card 40 is handled by the operator of the still-video camera to be mounted in the mounting unit 30. Namely, the IC memory card 40 is inserted in the mounting unit 30 in such a manner that the end portion of the IC memory card 40 contacts the innermost portion of the mounting unit 30, and is pressed so that a terminal of the IC memory card is connected to a terminal of the connector 31. The mounting unit 30 is provided with a card ejecting mechanism (not shown). This card ejecting mechanism is operated by the eject switch 124, enabling the IC memory card 40 to be ejected from the mounting unit 30.

An operating unit 12 and a display unit 13 are connected to the system control circuit 11. The operating unit 12 has the main switch (main switch) 120, the release switch 121, the zoom switch 122, the mode selecting switch 123 and the eject switch 124. The release switch 121 is operated when photography is carried out and thus the photographed image is recorded in the IC memory card 40. The zoom switch 122 is operated when a zoom lens included in the photographing lens 3 is driven so as to change the focal length to a telephoto condition or a wide-angle condition. The mode selecting switch 123 is operated to set the usual photography mode or the reading mode. The eject switch 124 is operated when the IC memory card 40 is ejected from the mounting unit 30. Further, the operating unit 12 may be provided with a record mode selecting switch for selecting either the field record mode or the frame record mode, and a designating switch for designating a recording area on the IC memory of the IC memory card 40 on which the image signal is to be recorded.

When the mode selecting switch 123 is turned ON, a mode selecting signal is inputted into the system control circuit 11 so that the reading mode is set. In accordance with the reading mode, the photographing lens system 3 is displaced along the optical axis towards the object, and projects from the front surface of the camera body 10 by an amount greater than under the usual photography mode. Conversely, when the mode selecting switch 123 is turned OFF, the usual photography mode is set.

The display unit 13 has a liquid crystal display or a light-emitting diode to indicate, for example: whether the main switch 120, the mode selecting switch 123, etc., are turned ON or OFF; that the field record mode or the frame record mode has been selected by the record mode selecting switch; the photography date; whether the IC memory card 40 is mounted or not; the recording area of the IC memory card 40 in which an image signal is to be stored; information relating to flash photography, the zooming magnification; the current time; etc.

An electric power supply circuit 14 is connected to the system control circuit 11 to supply electric power. The electric power supply circuit 14 is connected to a battery 15, and has a terminal for connecting to another electric power supply circuit 16 provided outside the still-video camera 1.

An output terminal 41 is provided for outputting a signal to a device provided outside the still-video camera 1, and is connected to the system control circuit 11 through an interface circuit 42.

An EEPROM 43 is connected to the system control circuit 11. In the EEPROM 43, index data corresponding to each possible photography mode of the still-video camera 1 are stored. As described later, when a data symbol is detected by this still-video camera 1 and it is determined that decoded data corresponding to this data symbol is coincident with index data stored in the EEPROM 43, the photography mode of the still-video camera 1 is set in accordance with the index data.

The radiation unit 91 of the electronic flash is a xenon lamp, for example, and is operated by a flash drive circuit 17 through the system control circuit 11. The amount of light (i.e., the radiating time) is controlled by a light amount adjusting circuit provided in the flash drive circuit 17.

This still-video camera 1 has an illumination unit 9 for luminating a data symbol with light when the data symbol is optically read in the macrophotography mode. The illumination unit 9 has light'sources 92 and 93 which have light emitting diodes (LED) 921 and 931, and is positioned symmetrically about the photographing lens system 3 as shown in FIG. 1, and an LED drive circuit 60.

Figure 3:
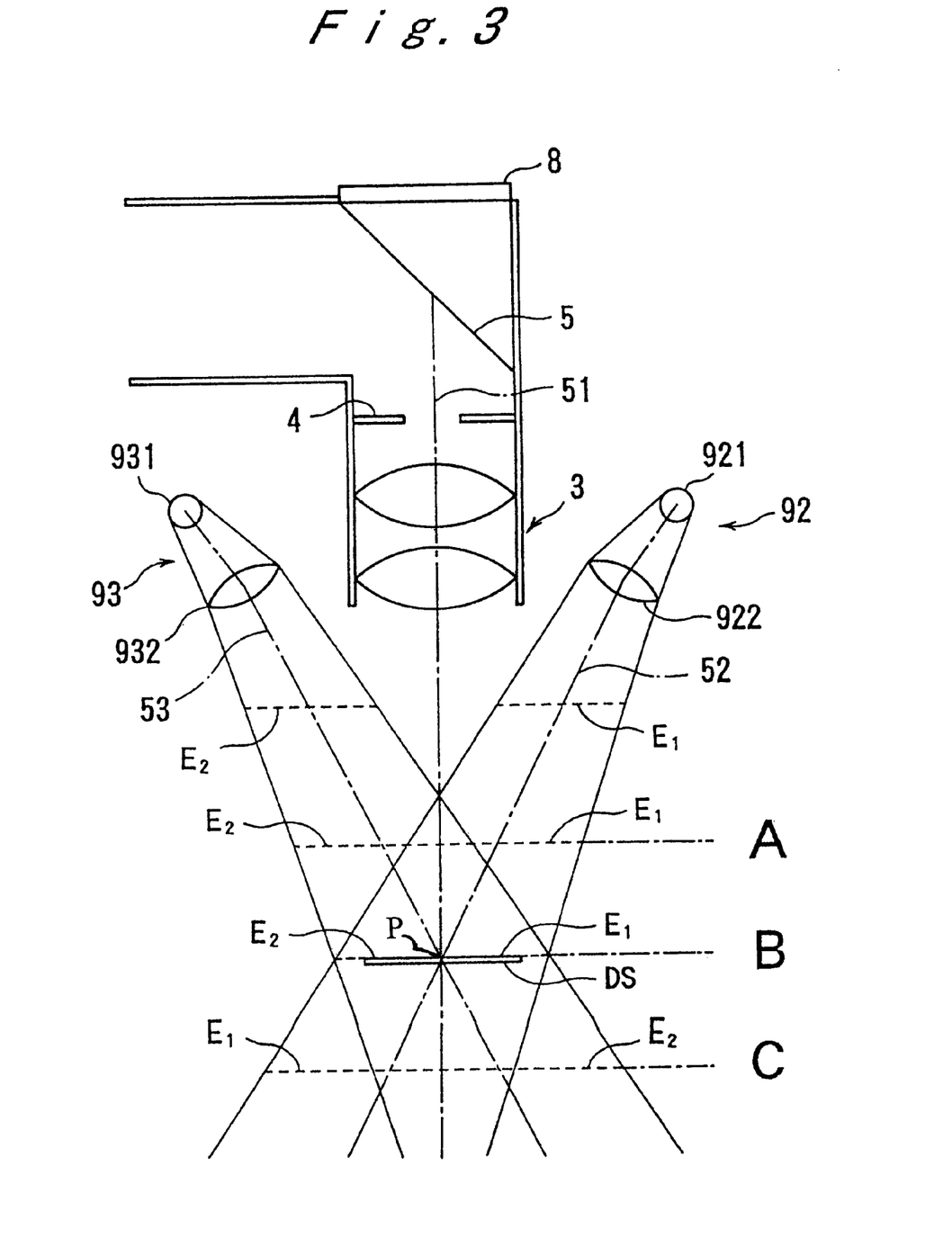
FIG. 3 is a view showing an arrangement of an illumination unit.

FIG. 3 shows an arrangement of the photographing lens system 3, the aperture 4, the half mirror 5, the CCD 8 and the illumination unit 9. As shown in this drawing, light beams emitted by the LEDs 921 and 931 are condensed to some extent by condenser lenses 922 and 932 to become spot lights, which are radiated onto a data symbol DS.

The radiation centers of the LEDs 921 and 931 are located at the optical axis 52 of the condenser lens 922, and the optical axis 53 of the condenser lens 932, respectively. The pair of LEDs 921 and 931 and the pair of condenser lens 922 and 932 are symmetrically disposed about the optical axis 51 of the photographing lens system 3. The optical axes 52 and 53 are inclined to the optical axis 51 by predetermined angles, and these optical axes are included in the same plane. Namely, the light sources 92 and 93 emit light beams which intersect each other.

Beam spots E1 and E2 are radiation areas of the light sources 92 and 93, and are obtained by cutting the light beams from the LEDs 921 and 931 with a plane perpendicular to the optical axis 51 of the photographing lens system 3 or the CCD 8.

The beam spots E1 and E2 overlap each other at a position where the three optical axes 51, 52 and 53 intersect (plane B in FIG. 3), and the centers of the beam spots E1 and E2 are located at the same position as each other at the intersection position (indicated by reference P in FIG. 3). In the reading mode, the photographing lens system 3 is controlled so as to focus on the plane where the beam spots E1 and E2 approximately fully overlap each other, and the data symbol DS is placed at the intersecting or overlapping portion of the light beams. Further, in the reading mode, the zoom lens included in the photographing lens system 3 is moved to a predetermined postion, and thus, an angle of view is fixed so that the beam spots E1 and E2, at a position where the beam spots E1 and E2 overlap each other, are set in the photographing area (reading area). Note that the centers of the beam spots E1 and E2 are coincident with the center of the photographing area when the beam spots E1 and E2 substantially overlap.

Optionally, the LEDs 921 and 931 can be replaced by an incandescent lamp. When the LEDs 921 and 931 are replaced by spot lamps by which spot lights are formed, the condenser lenses 922 and 932 can be omitted.

In the reading mode, when the release switch 121 is partly depressed, the LEDs 921 and 931 are radiated by the LED drive circuit 60 under control of the system control circuit 11. When the release switch 121 is fully depressed, the CCD 8 is driven by the CCD drive circuit 21, and thus the data symbol DS is photographed and the information contained therein is decoded in accordance with the photographed image obtained by the CCD 8.

Figure 4:
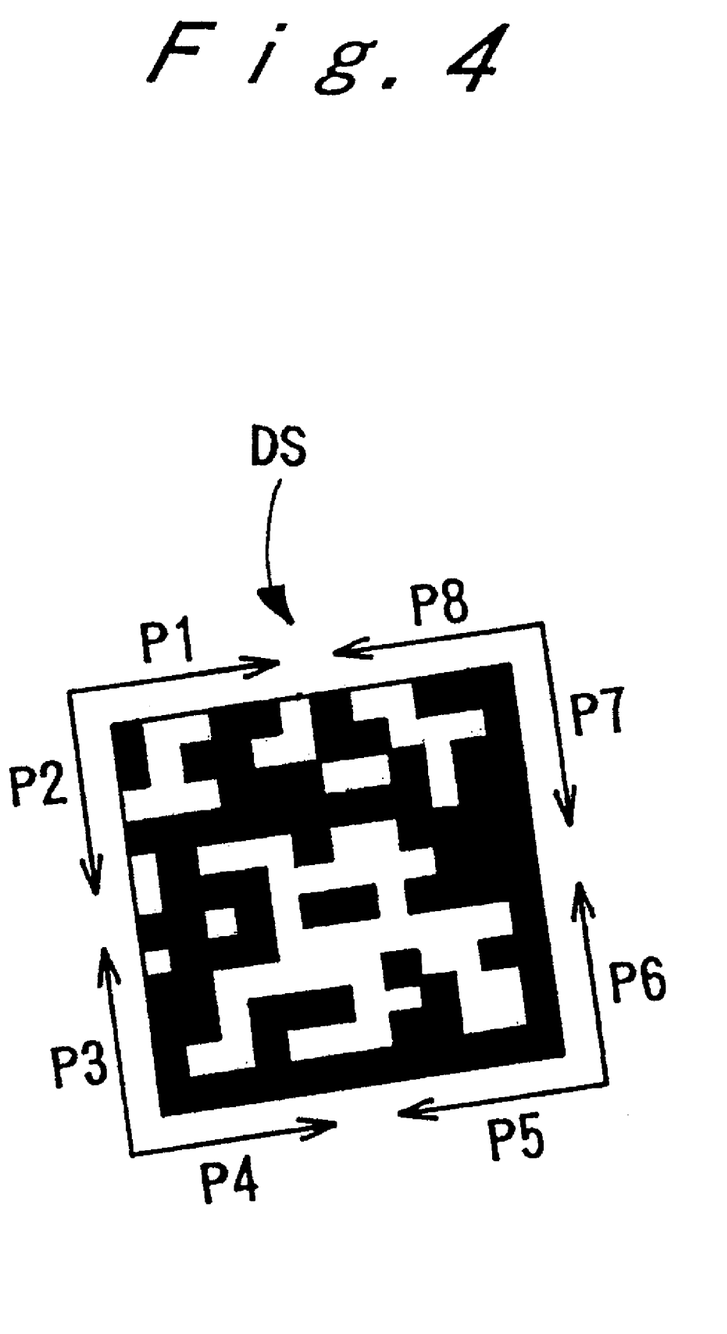
FIG. 4 is a view showing an example of a data symbol.

FIG. 4 shows an example of the data symbol DS. The data symbol has a pattern corresponding to photographing information. In this example, the data symbol DS has a mosaic arrangement in which a black or white (or transparent) square is arranged in an X-line by a Y-row matrix (X and Y are integers greater than 1). The black or white squares means 0 or 1 in binary notation, for example, and by a combination of these squares, specific information is represented. Note that the data symbol DS is not restricted to the structure shown in the drawing.

The information indicated by the data symbol corresponds to a photography mode, each photography mode encompassing an exposure mode (such as a program mode, an aperture-priority mode, a shutter speed priority and a manual mode), a drive mode (such as a one frame photography mode, a sequential photography mode, an interval photography mode or a self-timer photography mode), information regarding photographing conditions such as whether a photographing date and time are recorded in the recording medium, and information regarding other conditions such as an erasing mode (e.g. erasing whole image signals or one frame image signal).

An operation of the still-video camera will described below.

When information is obtained from the data symbol DS, the mode selecting switch 123 is operated so that the reading mode is selected, and thus, the photographing lens system 3 is moved to a predetermined position to perform macrophotography. As a result, the photographing lens system 3 focus onto a position where the beam spots E1 and E2 are substantially completely overlapped with each other (plane B in FIG. 3B), and the angle of view of the still-video camera 1 is set in such a manner that the beam spots E1 and E2, at a position where the beam spots E1 and E2 are substantially completely overlapped with each other, are completely included in the photographing frame of the still-video camera 1.

Then, when the release switch 121 is partly depressed, illumination light is emitted by the light sources 92 and 93. Note that the orientation of the still-video camera 1 is set by the operator in such a manner that the optical axis of the photographing lens system 3 is substantially perpendicular to the data symbol DS.

As shown in FIGS. 3, 5A, 5B and 5C, the shapes of the beam spots of the light luminating the plane on which the data symbol DS is placed, i.e., the sectional areas and the shapes of the beam spots E1 and E2 of the light from the light sources 92 and 93, vary in accordance with the distance between the data symbol DS and the photographing lens system 3. In other words, the shapes of the beam spots on a plane perpendicular to the optical axis of the CCD 8 vary in accordance with the distance to the plane.

Figure 5A:
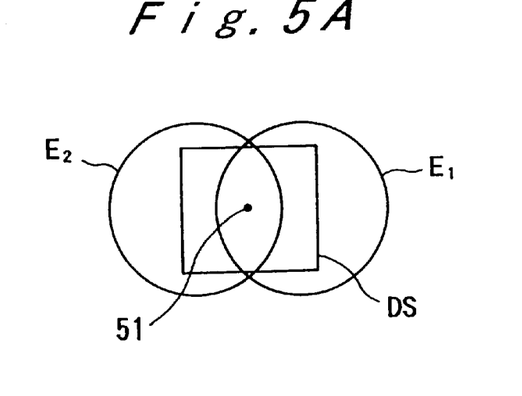
FIG. 5A is a view showing beam spots and the data symbol when the data symbol is placed at a position closer to the still-video camera than the proper position.
Figure 5B:
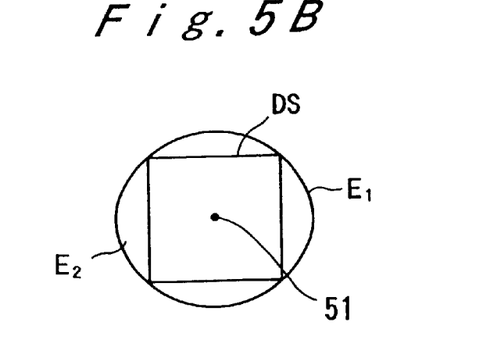
FIG. 5B is a view showing beam spots and the data symbol when the data symbol is placed at the proper position.

When the data symbol DS is optically read, the relative position between the data symbol DS and the still-video camera 1 is adjusted by the operation based on the spot shapes of the light from the light sources 92 and 93, i.e. the spots E1 and E2, and the data symbol DS is placed as shown in FIG. 5B. Namely, the distance between the data symbol DS and the photographing lens system 3 is adjusted by the operator in such a manner that the spots E1 and E2 substantially completely overlap each other (i.e. the radiation areas of the beam spots E1 and E2 become smallest), and thus, the position of the still-video camera 1 relative to the data symbol DS along the optical axis 51 is correctly set. By this adjustment, the photographing lens system 3 focuses on the data symbol DS, and the magnification of the image of the data symbol DS (i.e. the size of the data symbol DS relative to the photographed frame) becomes a predetermined value (a constant value).

As shown in FIG. 5B, the data symbol DS is moved in the photographing plane (a plane perpendicular to the optical axis 51) so that the data symbol DS is disposed within the beam spots E1 and E2 which overlap each other. Thus, the data symbol DS is placed in the photographing frame, i.e. within the reading area of the CCD 8, and is positioned at the center of the photographing frame. Namely, the beam spots E1 and E2, at the intersection position, have sectional shapes covering the data symbol DS. Note that the beam spots E1 and E2 overlapping each other may be slightly-larger than the data symbol DS. As can be seen from FIG. 5B, data symbol DS occupies over half of the area formed by the overlap of light beams E1 and E2.

Figure 5C:
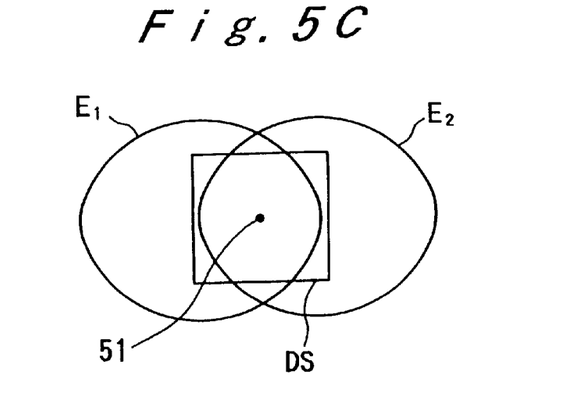
FIG. 5C is a view showing beam spots and the data symbol when the data symbol is placed at a position further from the still-video camera than the proper position.

When the data symbol DS is too close to the photographing lens system 3 as shown in FIG. 5A (also shown by reference A in FIG. 3), or when the data symbol DS is too far from the photographing lens system 3 as shown in FIG. 5C (also shown by reference C in FIG. 3), the beam spots E1 and E2 do not overlap completely.

An operation, in which information is read from the data symbol DS and an object image is recorded in the IC memory card 40 by the system control circuit 11, is described below with reference to flow charts shown in FIGS. 6A, 6B, 7A, 7B, 8 and 9.

Figure 6A:
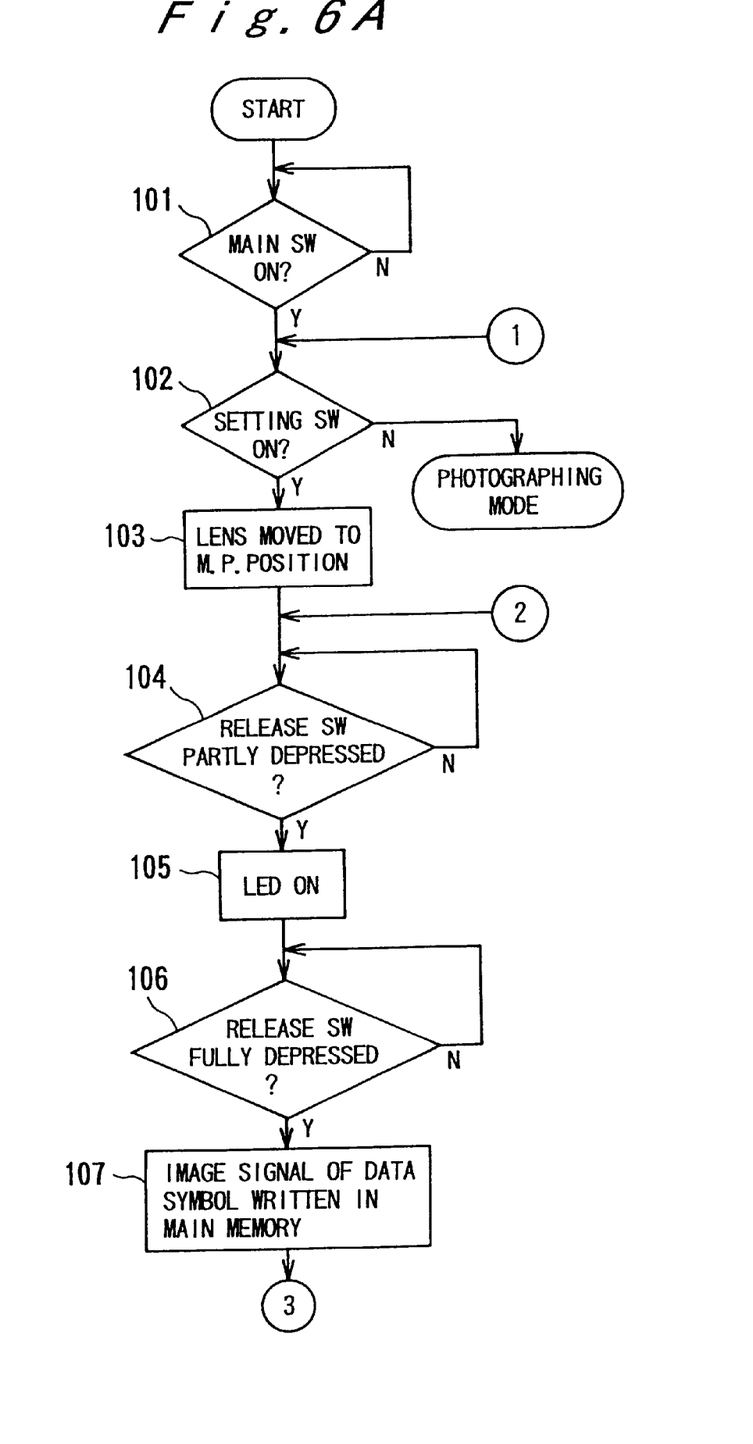
FIG. 6A is a former part of a flow chart of a main program.
Figure 6B:
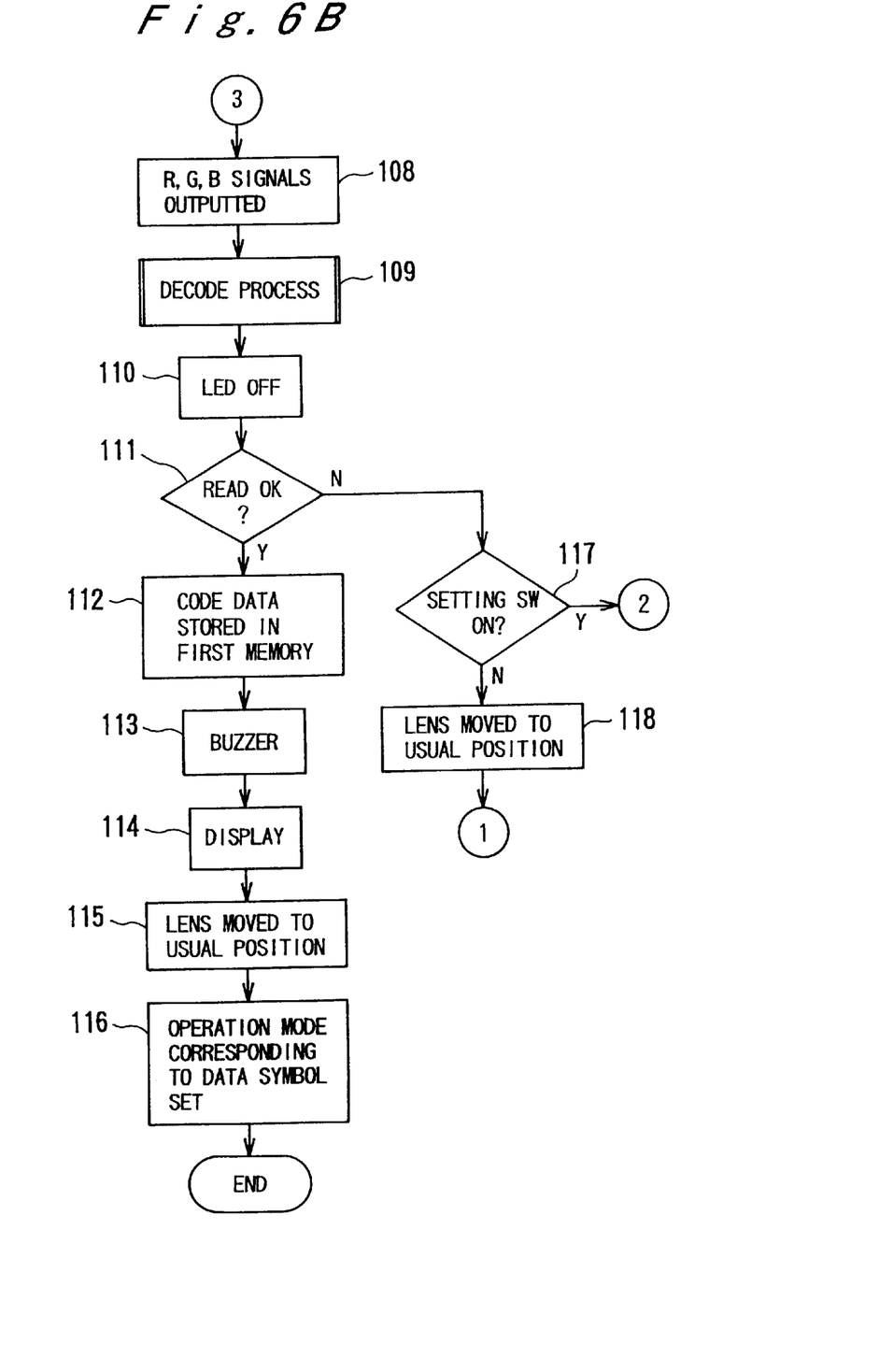
FIG. 6B is a latter part of the flow chart of the main program.

FIGS. 6A and 6B show a flow chart of a main program.

In Step 101, it is determined whether or not the main switch 120 has been turned ON. When it is determined that the main switch 120 is turned ON, it is determined in Step 102 whether or not the mode selecting switch 123 has been turned ON or OFF.

When it is determined in Step 102 that the mode selecting switch 123 has been turned OFF, the usual photography mode is set, in which usual photography is carried out and the photographed image is recorded in the IC memory card 40, as described later with reference to FIG. 9. Note that macrophotography can still be performed when the usual photography mode has been selected.

Conversely, when it is determined in Step 102 that the mode selecting switch 123 has been turned ON, the reading mode is set. Namely, the photographing lens system 3 is moved to the macro photography position in Step 103. Thus, all of the photographing lens system 3, including the zoom lens and the focusing lens, are moved forward toward the object by an amount which is greater than that of a usual photography mode, so that macrophotography, in which the object distance is shorter than in the usual photography mode can be performed. In this state, the photographing lens system 3 focuses on plane B (FIG. 3) where the beam spots E1 and E2 overlap each other, and the ovelapped beam spots E1 and E2 are wholly positioned within the photographing frame of the CCO 8.

Then, when it is determined in Step 104 that the release switch 121 has been partly depressed, the LED drive circuit 60 is operated so that the LEDs 921 and 931 radiate light in Step 105. The operator positions the data symbol DS and the still-video camera 1 so that the beam spots E1 and E2 overlap each other at the plane on which the data symbol DS is placed, and the data symbol DS is positioned within the overlapped beam spots E1 and E2 as shown in FIG. 5B.

Then, when it is determined in Step 106 that the release switch 121 has been fully depressed, a photographing operation is carried out. Namely, in Step 107, signals outputted from the CCD 8 are subjected to a predetermined process by the signal processing circuit 24, converted to digital image signals, and the digital image signals (magenta, yellow, cyan and green signals) of the data symbol are written in predetermined addresses of the main memory 26. In Step 108, the digital image signals are read from the main memory 26 and are inputted into the RGB-matrix circuit 27, in which the magenta, yellow, cyan and green signals are subjected to a predetermined process to be converted to red (R), green (G) and blue (B) image signals. Then, in Step 109, a decode process is performed based on the R-, G- and B-signals outputted from the RGB-matrix circuit 27 so that the information indicated by the data symbol is decoded as described later with reference to FIG. 7A and 7B.

After the LEDs 921 and 931 are turned OFF by the LED drive circuit 60 in Step 110, it is determined in Step 111 whether or not the data symbol could be read in the decode process (Step 109) based on a "read OK" flag set or reset in the decode process. When the "read OK" flag has been set, i.e. when the data symbol could be read, in Step 112, the decoded data of the data symbol is stored in a predetermined address of a first memory 11a provided in the system control circuit 11. Then, in Step 113, a buzzer meaning that the reading operation of the data symbol was successful is actuated. This buzzer may be replaced with an indication on the display unit 13.

In Step 114, an indication meaning that usual photography can be carried out in accordance with conditions corresponding to the data read from the data symbol, and the contents of the photography conditions, are indicated by the display unit 13.

In Step 115, the photographing lens system 3 is returned from the macrophotography position to the usual photography position. In Step 116, the photography mode corresponding to the decoded data of the data symbol is set by the system control circuit 11. Thus, this program ends.

When it is determined in Step 111 that the "read OK" flag has been reset, the process goes to Step 117, in which it is determined whether or not the mode selecting switch 123 has been turned ON. When it is determined that the mode selecting switch 123 has been turned ON, the process returns to Step 104. When it is determined that the mode selecting switch 123 has been turned OFF, the photographing lens system 3 is moved from the macrophotography position to the usual photography position in Step 118, and then, the process returns to Step 102.

Figure 7A:
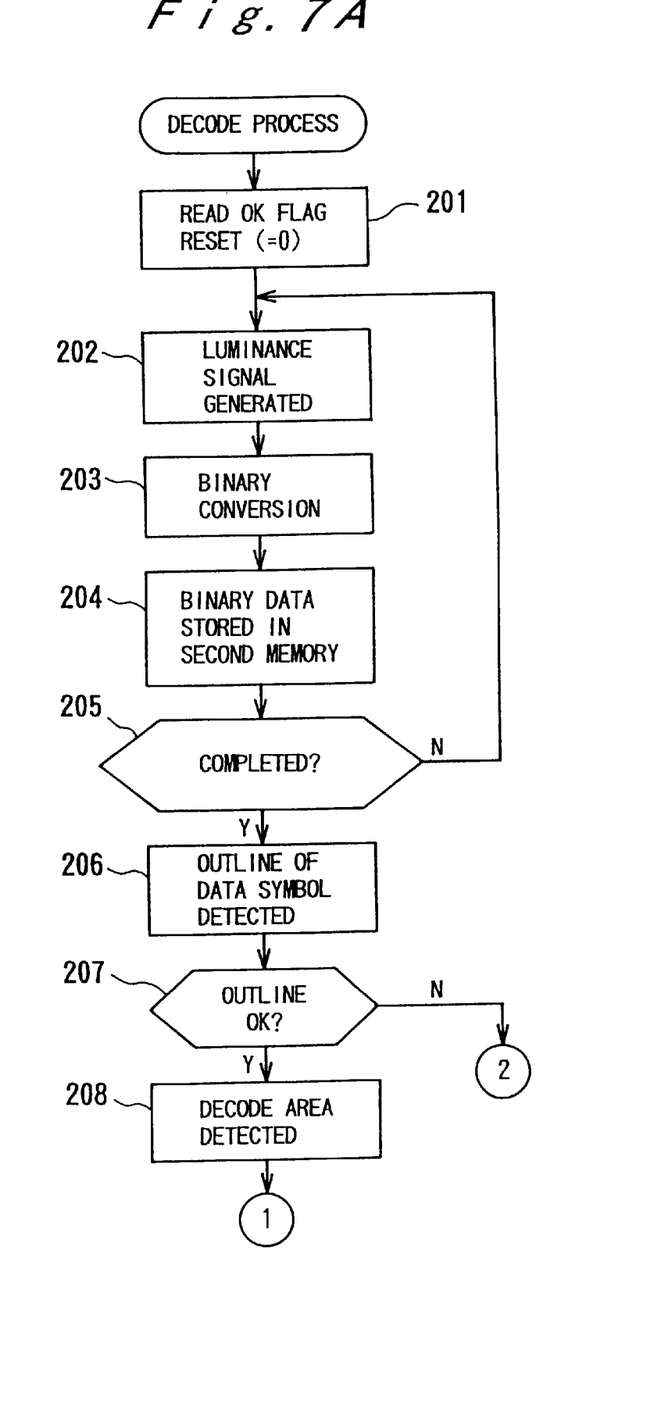
FIG. 7A is a former part of a flow chart of a subroutine by which a decode process is execute.
Figure 7B:
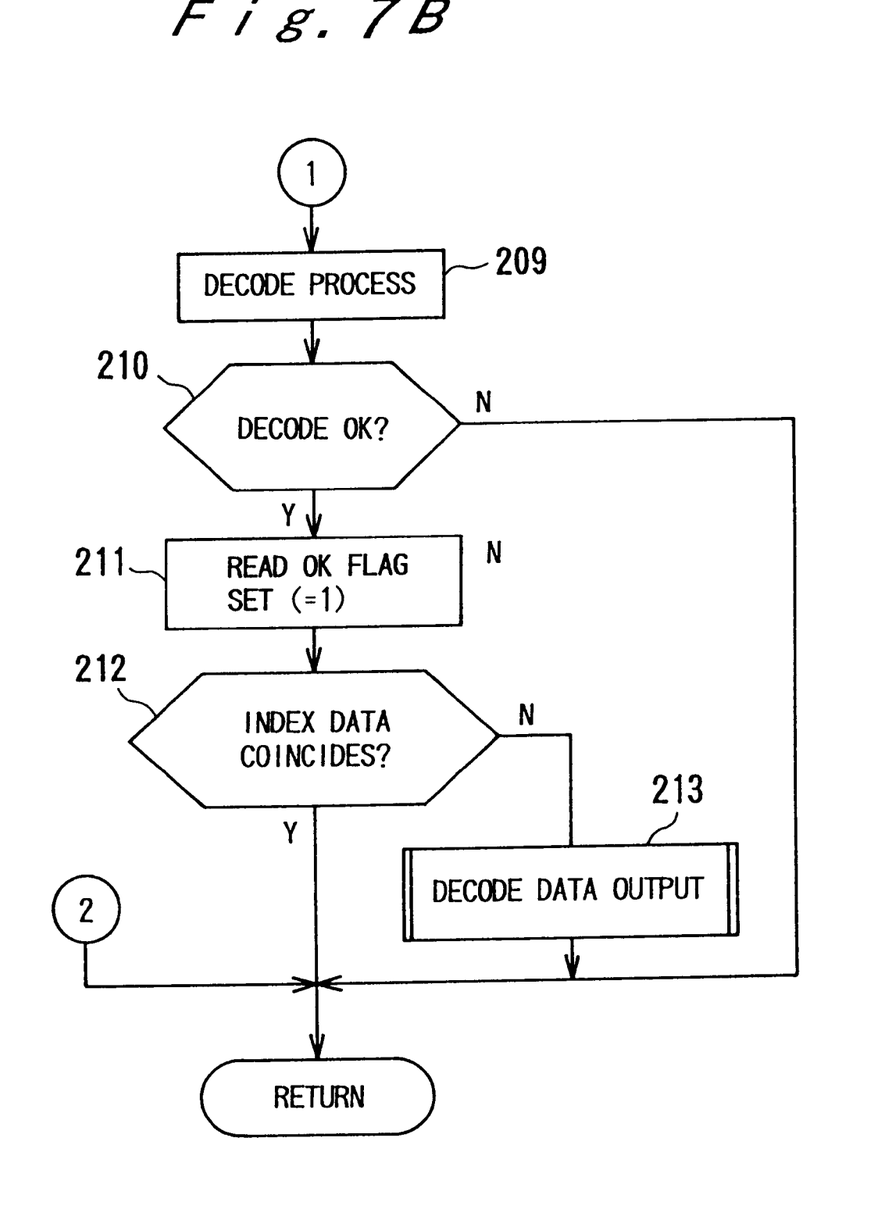
FIG. 7B is a latter part of the flow chart shown in FIG. 7A.

FIGS. 7A and 7B show a flow chart of a subroutine of the decode process carried out in Step 109 of the main program (FIG. 6B).

In Step 201, the "read OK" flag is reset to 0. As described later, this flag is set to 1 in Step 211 when it is determined in Step 210 that the decoding operation has been sucessfully carried out.

In Step 202, a luminance signal is generated in accordance with R-, G- and B-signals outputted from the RGB-matrix circuit 27. In Step 203, the luminance signal is compared with a threshold value, so that the luminance signal is converted to binary data. The binary data is stored in a second memory (RAM) 11b provided in the system control circuit 11 in Step 204. Steps 202 through 204 are executed until it is determined in Step 205 that one frame's worth of binary data (corresponding to the effective light receiving area of the CCD 8) has been stored in the second memory 11b.

When it is determined in Step 205 that the storing operation has been completed, Step 206 is executed in which the outline of the data symbol is detected in accordance with the information of the data symbol to be decoded. As shown in FIG. 4, the outline of the data symbol is a solid line forming a square, and in Step 206, the outermost black pixels are detected, so that the outline of the data symbol is found. In Step 207, it is determined whether or not the outline of the data symbol has been detected, i.e. whether or not the outline is square. For example, if the data symbol does not exist, or if a part of the data symbol protrudes from the reading area of the CCD 8, the square outline is not found. Therefore, this subroutine ends. Conversely, if the outline of the data symbol has been detected, the process goes to Step 208.

In Step 208, the information enclosed by the square outline is deemed to be a decode area, and the information in the decode area is read. This reading operation is described with reference to FIG. 4. First, a direction P1 is set to be the main scanning direction, a direction P2 is set to be the sub-scanning direction, and the decode area is read. Then, a direction P3 is set to be the main scanning direction, a direction P4 is set to be the sub-scanning direction, and the decode area is read. Similarly, a direction P5 and a direction P6 are set to be the main scanning directions, a direction P6 and a direction P8 are set to be the sub scanning directions, and the decode areas are read. Thus, four data are obtained. In Step 209, a decode process is applied to each four data so that the parity check is carried out. In accordance with the parity check, the main scanning direction and the sub scanning direction of the data symbol are determined.

In Step 210, it is determined whether or not a decode area which has passed the parity check has been found. If there is not a decode area satisfying the parity check, the subroutine ends. If a decode area satisfying the parity check has been found, the process goes to Step 211, in which the "read OK" flag is set to 1. In Step 212, it is determined whether or not the decoded data obtained from the decode area is coincident with any of the index data stored in the EEPROM 43. When the decoded data is coincident with any of the index data, the process returns to Step 110 of the main program (FIG. 6B) so that the photography mode of the still-video camera 1 is set in accordance with the decoded data in Step 116 of the main program.

Conversely, when the decoded data is not coincident with any index data in the EEPROM 43, Step 213 is executed in which the decoded data is outputted to a device (not shown) provided outside the still-video camera 1 through the output terminal 41 (FIG. 2).

Figure 8:
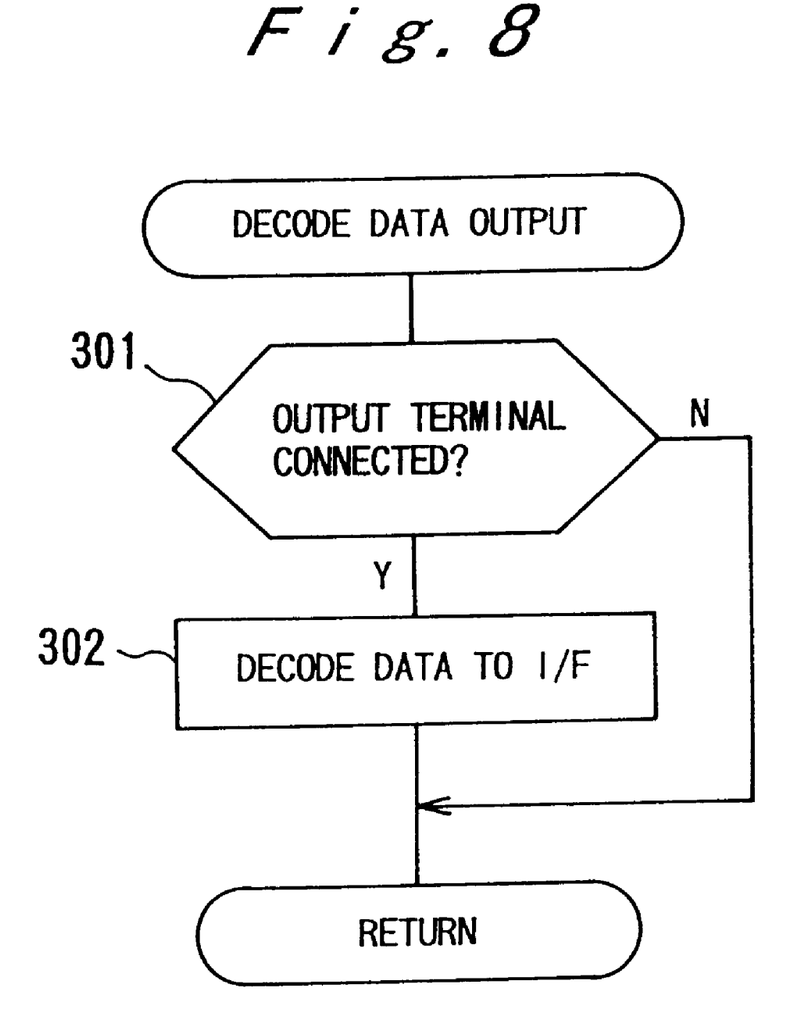
FIG. 8 is a flow chart of a subroutine by which decode data is outputted to a device outside the still-video camera.

FIG. 8 shows the subroutine by which the decoded data is outputted. In Step 301, it is determined whether or not a communication cable of the outside device is connected to the output terminal 41 through the interface circuit 42. If the communication cable is connected to the output terminal 41 so that the communication can be carried out, a voltage of a predetermined terminal of the connected terminals becomes the ground level, and thus, the connecting condition is recognized by the system control circuit 11 through the interface circuit 42. When it is determined in Step 301 that the communication cable is connected to the output terminal 41, Step 302 is executed, so that the decoded data is outputted to the outside device through the interface circuit 42 and the output terminal 41. Conversely, when it is determined in Step 301 that the communication cable is not connected to the output terminal 41, this subroutine returns to the subroutine shown in FIG. 7B.

Figure 9:
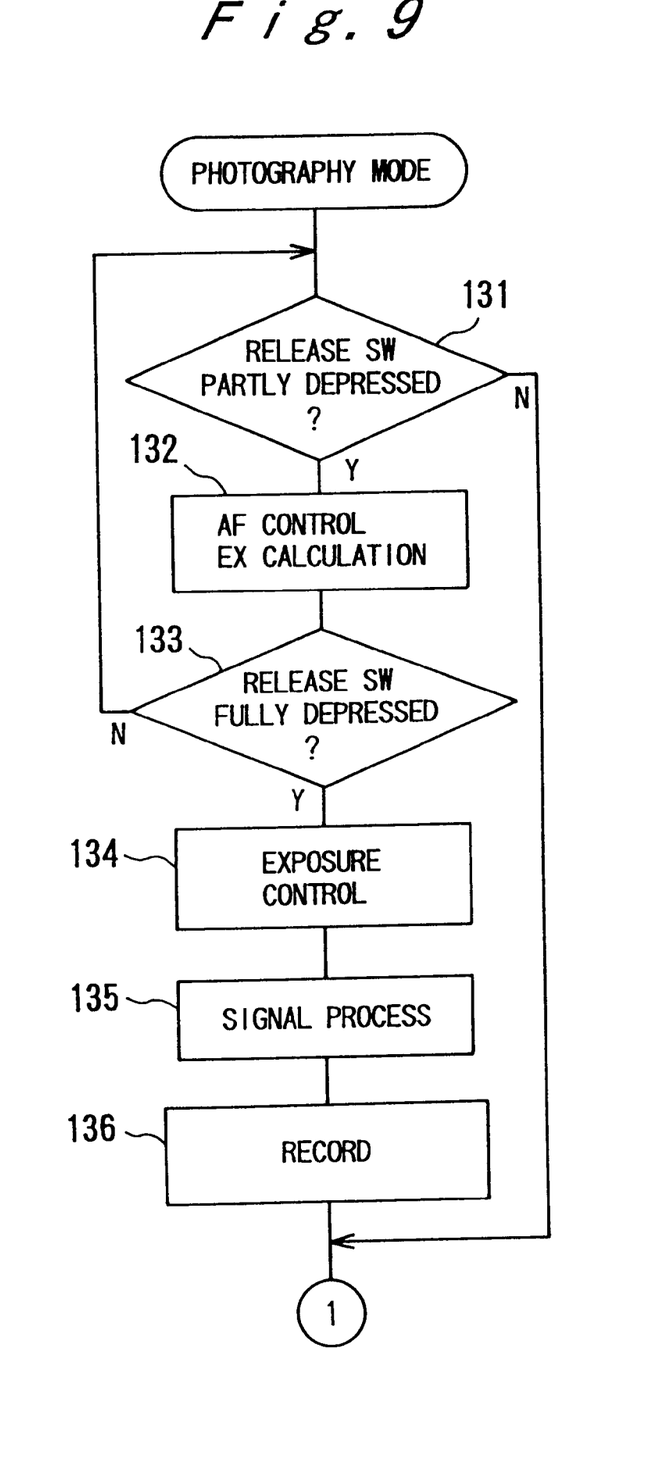
FIG. 9 is a flow chart of a program of a usual photography mode.

FIG. 9 shows a routine of the usual photography mode, which is executed when it is determined in Step 102 of FIG. 6A that the mode selecting switch 123 has been turned OFF.

If it is determined in Step 131 that the release switch 121 is not partly depressed, the process goes to Step 102 of FIG. 6A, and if it is determined in Step 131 that the release switch 121 is partly depressed, the process goes to Step 132. Namely, an automatic focus control is performed so that the photographing lens system 3 is moved to the in-focus position, and an exposure calculation is carried out so that the aperture value and the shutter speed are obtained in accordance with the operation mode set in Step 116 of FIG. 6B.

Then, if it is determined in Step 133 that the release switch 121 is not fully depressed, the process returns to Step 131, and if it is determined in Step 133 that the release switch 121 is fully depressed, Step 134 is executed in which an exposure control is performed. Namely, the CCD 8 is exposed and electronic charge signals generated in the CCD 8 are read out therefrom. In Step 135, the electronic charge signals are subjected to a signal process, so that image signals to be recorded are obtained. In Step 136, the image signals are recorded in the IC memory card 40. Thus, the process goes to Step 102 of FIG. 6A.

As described above, according to the embodiment, the still-video camera 1 can optically read and decode a data symbol indicating a photography mode of the still-video camera 1, and can be operated in accordance with that photography mode. Namely,the photography mode is easily set in the still-video camera 1, without tedious preparations.

Further, in the still-video camera 1 of the embodiment, without attaching a reading device onto the outer surface of the still-video camera 1, the data symbol can be read easily and promptly, i.e. the data symbol can be easily photographed and decoded, so that a predetermined mode setting can be easily set. Thus, since no outside reading device is needed to be attached to the still-video camera 1, the data symbol reading system including the still-video camera 1 is miniturized and lightened.

Still further, in the still-video camera 1 of the embodiment, two light beams, i.e. the beam spots E1 and E2, can function as a guide for positioning the still-video camera 1 relative to the data symbol in the optical axis direction, and as a guide for setting the magnification of the image of the data symbol to a constant value. Therefore, when the data symbol is to be read, the data symbol can be positioned at the proper position, and thus, be properly read.

Further, in the still-video camera 1 of the embodiment, since the magnification of the image of the data symbol is set to a constant value whenever the data symbol is read, a circuit for performing a signal process such as a decode process can be simplified. Furthermore, in the still-video camera 1 of the embodiment, since the position of the data symbol is determined in accordance with the beam spots, the positioning can be easily carried out and the data symbol can be read even under low-light condition.

Note that, in the reading mode, although the photographing lens system 3 is projected toward the object to a predetermined position so that macrophotography can be carried out, an optical element may be inserted in the photographing lens system 3, or one of the optical elements included in the photographing lens system 3 may be changed so that macrophotography is alternatively performed. Further, in the reading mode, a specific photographing lens exclusively used for macrophotography or for reading the data symbol may be attached to the still-video camera 1.

Still further, note that, in the reading mode, the photographing optical system 2 may have an auto-focus mechanism by which the photographing lens system 3 automatically focuses on the data symbol. In this construction, the beam spots E1 and E2 are used for positioning the data symbol within the reading area and for fixing the magnification of the image to a constant value, then the beam spots E1 and E2 are ovelapped with each other, and then the data symbol is placed on the plane where the beam spots E1 and E2 overlap so that the data symbol is read.

Although the illumination unit 9 has a pair of light sources 92 and 93 in the embodiment, the illumination unit 9 may have only one light source or more than two light sources. When only one light source is provided, the positioning of the data symbol is carried out in such a manner that the four corners of the data symbol are coincident with the outline of the beam spot, and the photographing lenses 3 focus on the data symbol so that the beam spot is included in the reading area of the CCD 8.

A one-dimensional data symbol such as a bar code may be used instead of the two-dimensional data symbol.

The recording medium may be a memory mounted in the still-video camera 1, a magnetic recording medium, a magneto-optical recording medium, or an optical recording medium.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 6-120617 (filed on May 10, 1994) which is expressly incorporated herein, by reference, in its entirety.

What is claimed is:

1. A still-video camera, comprising:
   a photographing lens system that forms an image of an object to be photographed at a predetermined position;
   an image receiving unit, located at said predetermined position, for generating an image signal corresponding to said image of said object;
   a selection device which selects one of an optical photographing function setting or a normal photography setting;
   a decoder which decodes information of a data symbol based on an image signal generated by said image receiving unit when said optical photographing function setting is selected and when said data symbol, corresponding to said object, is photographed through said photographing lens system, said data symbol having a pattern corresponding to photographing information;
   a first memory for storing said information decoded by said decoder;
   a second memory for storing index data corresponding to a photography mode of said still-video camera;
   a determination device which determines whether said decoded information stored in said first memory is coincident with said index data stored in said second memory; and
   a setting device which sets a photography mode corresponding to said decoded information when said decoded information is coincident with said index data.

2. A still-video camera according to claim 1, wherein said image receiving unit comprises a charge coupled device.

3. A still-video camera according to claim 1, wherein said data symbol comprises two-dimensional data symbol.

4. A still-video camera according to claim 1, wherein, when said data symbol is photographed in said optical photographing function setting, a macrophotography to said data symbol is performed in which an object distance is shorter than an object distance for normal photography.

5. A still-video camera according to claim 1, further comprising an output terminal for outputting a signal to a device provided outside said still-video camera, said decoded information being outputted through said output terminal when said decoded information is not coincident with any of said index data.

6. A still-video camera according to claim 1, wherein said photographing information includes at least one of a program mode, an aperture-priority mode, a shutter speed priority, a manual exposure mode, a one frame photography mode, a sequential photography mode, an interval photography mode, a self-timer photography mode, information regarding a photographing condition, and information regarding other than a photographing condition.

7. A still-video camera according to claim 1, further comprising a generator device which generates a luminance signal in accordance with a plurality of color signals obtained by said image receiving unit, said decoder decoding said information based on said luminance signal.

8. A still-video camera according to claim 1, further comprising a camera body and an illumination unit, said image receiving unit and said illumination unit being housed in said camera body, said illumination unit illuminating said data symbol with light, a shape of a beam spot of said light on a plane perpendicular to an optical axis of said image receiving unit varying in accordance with a position of said plane.

9. A still-video camera according to claim 8, wherein said illumination unit has a pair of light sources which emit light beams that mutually intersect.

10. A still-video camera according to claim 9, wherein said data symbol is placed at an intersecting position of said light beams.

11. A still-video camera according to claim 10, wherein said beam spot at said intersecting position has a sectional shape covering said data symbol, said sectional shape being obtained by cutting said beam spot by said plane.

12. A still-video camera according to claim 9, wherein a center of each beam spot formed by said pair of light sources are located at the same position as each other at an intersecting position.

13. A still-video camera according to claim 12, wherein said centers are located on said optical axis.

14. A still-video camera according to claim 9, wherein said light sources are located symmetrically about said optical axis.

15. A still-video camera, comprising:

a camera body;

a photographing lens system that forms an image of an object to be photographed at a predetermined position;

a device that selects one of an optical photographing function setting or a normal photography setting;

an illumination unit having a plurality of light sources which emit light beams when said optical photographing function setting is selected, the illumination unit illuminating a data symbol, which corresponds to the object, with said light beams;

an image receiving unit, located at said predetermined position, for generating an image signal corresponding to said image of said object, said image receiving unit and said illumination unit being housed in said camera body, an amount of an overlap of a plurality of beam spots formed by the plurality of light beams on a plane perpendicular to an optical axis of said image receiving unit varying in accordance with a distance between the photographing lens system and the plane;

a system that decodes information of the data symbol based on an image signal generated by said image receiving unit when said optical photographing function setting is selected and when said data symbol is photographed through said photographing lens system, said data symbol having a pattern corresponding to photographing information; and a system that controls said photographing lens system, in response to selection of said optical photographing function setting by said device, to focus the photographing lens system on the plane where the plurality of beam spots substantially completely overlap each other, wherein a front surface of the photographing lens system and front surfaces of the light sources are positioned substantially flush with a front surface of the camera body.

16. The still video camera of claim 15, wherein the plurality of beam spots which substantially completely overlap each other circumscribe said data symbol.

17. The still-video camera according to claim 15, wherein said image receiving unit comprises a charge coupled device.

18. The still-video camera according to claim 15, wherein said data symbol comprises a two-dimensional data symbol.

19. The still-video camera according to claim 15, wherein, when said data symbol is photographed in said optical photographing function setting, a macro photography operation is performed in which an object distance to said data symbol is shorter than an object distance for normal photography.

20. The still-video camera according to claim 15, further comprising a first memory for storing information decoded by said decoding system.

21. The still-video camera according to claim 20, further comprising a second memory for storing index data corresponding to a photography mode of said still-video camera, a system that determines whether said decoded information stored in said first memory coincides with said index data stored in said second memory, and a system that sets a photography mode corresponding to said decoded information when said decoded information coincides with said index data.

22. The still-video camera according to claim 21, further comprising an output terminal for outputting a signal to a device provided outside said still-video camera, said decoded information being output through said output terminal when said decoded information does not coincide with said index data.

23. The still-video camera according to claim 15, wherein said photographing information includes at least one of a program mode, an aperture-priority mode, a shutter speed priority mode, a manual exposure mode, a one-frame photography mode, a sequential photography mode, an interval photography mode, a self-timer photography mode, information regarding a photographing condition, and information regarding other than a photographing condition.

24. The still-video camera according to claim 15, further comprising a system that generates a luminescence signal in accordance with a plurality of color signals obtained by said image receiving unit, said decoding system decoding said information based on said luminescence signal.

25. The still-video camera according to claim 15, wherein centers of the plurality of beam spots formed by the plurality of light sources coincide on the plane where the plurality of beam spots substantially completely overlap each other, and are located on the optical axis.

26. The still-video camera according to claim 15, wherein the plurality of light sources are located at the same distance from the optical axis.

27. A still-video camera, comprising:

a camera body an illumination unit having a pair of light sources which emit light beams that intersect;

a photographing lens system that forms an image of an object to be photographed at a predetermined position;

an image receiving unit, located at said predetermined position, for generating an image signal corresponding to said image of said object, said image receiving unit and said illumination unit being housed in said camera body, said illumination unit illuminating said data symbol with said light beams, a shape of a beam spot of said light beams on a plane perpendicular to an optical axis of said image receiving unit varying in accordance with a position of said plane;

a device that selects one of an optical photographing function setting or a normal photography setting;

a system that decodes information of a data symbol based on an image signal generated by said image receiving unit when said optical photographing function setting is selected and when said data symbol, corresponding to said object, is photographed through said photographing lens system, said data symbol having a pattern corresponding to photographing information;

a first memory for storing information decoded by said decoding system;

a second memory for storing index data corresponding to a photography mode of said still-video camera;

a system that determines whether said decoded information stored in said first memory coincides with said index data stored in said second memory; and a system that sets a photography mode corresponding to said decoded information when said decoded information coincides with said index data.

28. The still-video camera according to claim 27, wherein said image receiving unit comprises a charge coupled device.

29. The still-video camera according to claim 27, wherein said data symbol comprises a two dimensional data symbol.

30. The still-video camera according to claim 27, wherein, when said data symbol is photographed in said optical photographing function setting, a macrophotography operation is performed in which an object distance to said data symbol is shorter than an object distance for normal photography.

31. The still-video camera according to claim 27, further comprising an output terminal for outputting a signal to a device provided outside said still-video camera, said decoded information being output through said output terminal when said decoded information does not coincide with said index data.

32. The still-video camera according to claim 27, wherein said photographing information includes at least one of a program mode, an aperture-priority mode, a shutter speed priority mode, a manual exposure mode, a one-frame photography mode, a sequential photography mode, an interval photography mode, a self-timer photography mode, information regarding a photographing condition, and information regarding other than a photographing condition.

33. The still-video camera according to claim 27, further comprising a system that generates a luminescence signal in accordance with a plurality of color signals obtained by said image receiving unit, said decoding system decoding said information based on said luminescence signal.

34. The still-video camera according to claim 27, wherein said data symbol is placed at an intersecting point of said light beams.

35. The still-video camera according to claim 34, wherein said beam spot at said intersecting point has a sectional shape covering said data symbol, said sectional shape being obtained by intersecting said beam spot with said plane.

36. The still-video camera according to claim 35, wherein said centers are located on said optical axis.

37. The still-video camera according to claim 27, wherein centers of beam spots formed by said pair of light sources coincide at an intersecting position of said beam spots.

38. The still-video camera according to claim 27, wherein said light sources are located symmetrically about said optical axis.

* * * * *